United States Patent [19]
Lenz

[11] Patent Number: 5,997,028
[45] Date of Patent: Dec. 7, 1999

[54] DEVICE FOR COUNTERACTING UNCONTROLLED ACTIVATION OF AIR BAGS

[75] Inventor: Thomas Lenz, Örebro, Sweden

[73] Assignee: Sunpro AB, Sweden

[21] Appl. No.: 08/952,202

[22] PCT Filed: Jun. 7, 1996

[86] PCT No.: PCT/SE96/00752

§ 371 Date: Nov. 7, 1997

§ 102(e) Date: Nov. 7, 1997

[87] PCT Pub. No.: WO96/41731

PCT Pub. Date: Dec. 27, 1996

[30] Foreign Application Priority Data

Jun. 8, 1995 [SE] Sweden .................................. 9502104
Jul. 5, 1995 [SE] Sweden .................................. 9502444

[51] Int. Cl.$^6$ .................................................. B60R 21/02
[52] U.S. Cl. .............................. 280/727; 280/750; 74/558
[58] Field of Search .................................. 280/727, 750, 280/731; 74/558

[56] References Cited

U.S. PATENT DOCUMENTS

| | | | |
|---|---|---|---|
| 3,982,602 | 9/1976 | Gorman | 280/727 |
| 5,131,290 | 7/1992 | Atkinson | 74/558 |
| 5,277,440 | 1/1994 | Jackson, Jr. | 280/727 |
| 5,613,383 | 3/1997 | Banez | 74/558 |

FOREIGN PATENT DOCUMENTS 501656  10/1995  Sweden .

*Primary Examiner*—Peter C. English
*Attorney, Agent, or Firm*—Larson & Taylor

[57] ABSTRACT

An apparatus for counteracting uncontrolled activations of air bags inflated by a pyrotechnical charge following a strong deceleration such as a crash. The apparatus has a pair of center plates having at least three arms displaced in relation to each other and having bent over hooks which engage the steering wheel ring of a vehicle and can be locked against the steering wheel. The center plate and the arms make it impossible to inflate the air bag which is mounted on the steering wheel of the vehicle.

9 Claims, 4 Drawing Sheets

DEVICE FOR COUNTERACTING UNCONTROLLED ACTIVATION OF AIR BAGS

FIELD OF THE INVENTION

The present invention relates to an apparatus for counteracting and inhibiting uncontrolled activation of so called "air bags" of the known type which are inflated by a pyrotechnical charge following a strong deceleration, such as in a collision.

BACKGROUND OF THE INVENTION

An increasing number of vehicles are today equipped with one, two or more air bags, in some countries following provisions of law. The purpose of an air bag is to protect a car driver and/or a passenger, as a supplement of a car safety belt, against injuries which may otherwise appear in case of a crash against an object in front. Sensors are mounted in the car body, which sensors, in case of a strong deceleration which often precedes a collision, provides an ignition of a pyrotechnical charge which makes the air bag become inflated by said charge.

For various reasons it may occur, however, that an air bag does not become inflated during a collision, and in such cases the air bag is a latent source of accident since said air bag may later become released and inflated accidentally.

Normally, the operation of an air bag is not supposed to fail, but in very special cases this may happen, for instance in case of a side crash, if the vehicle is run into from behind, or if the vehicle rolls over. The air bag is also not supposed to become released accidentally, but this may still happen. The reason may be that the sensors for the air bag have been damaged during the accident. All known installations need a source of electric power, but even if the current to the different parts of the air bag are switched off, for instance if the poles of the electric accumulator are removed, such measurement is not quite safe. The air bag does not always automatically stop working if the current is switched off. It is said that some air bags can be active as long as up to thirty minutes after the current has been switched off.

This means that the job for the rescue personnel taking care of injured persons in the vehicle involves problems and risks. On several known occasions the rescue personnel have been injured by exploding air bags while working for instance with injured persons and persons unable to exit from the car after an accident has happened. Apart from the extremely strong explosion power that the air bag exhibits, chemical residuals are spread in the vehicle occupant compartment when the air bag is being inflated, which residuals mainly consist of sodium hydroxide powder. Such powder may give rise to corrosion injuries.

SUMMARY OF THE INVENTION

For eliminating such risks for the rescue personnel the present invention provides a flexible apparatus formed to be mounted on the steering wheel, and preferably also in front of a passenger seat equipped with an air bag, before any rescue work is commenced in the occupant compartment of the vehicle, and which may comprise two or more mutually movable parts including a center plate and several connection arms adapted to be mounted around the steering wheel ring. In a first embodiment the apparatus is formed by two separate units, each consisting of a mounting plate and two connection arms, or one unit comprising two connection arms and the other one comprising one connection arm. By displacing the connection arms or the center plates said arms can be adapted to differently sized steering wheels. The units can be locked to each other, for instance by means of bolts or another locking means. In another embodiment the air bag protection apparatus comprises a sole protection plate which can be clamp connected to the steering wheel. In a third embodiment the protection apparatus comprises a protection plate mounted over the steering wheel and, connected thereto, a protection plate or protection frame mounted in front of a passenger seat air bag.

In a preferred embodiment the apparatus is also formed with a protection bag of a suitable material, for instance polyamide fabric, which is secured to the center plate, or the outermost center plate, and which is formed and mounted so that it can receive at least part of the gas which is issued by the air bag if said air bag is released accidentally. The protection bag is mounted against the center plate facing the vehicle driver. The protection bag can be arranged on the front side or on the rear side of the protection plate. In the latter case the protection bag is open and is formed with a strapping means at the open end thereof. After the protection apparatus has been mounted on and secured to the steering wheel the protection bag is pulled back-down over the steering wheel, and the mouth of the protection bag is strapped over the steering wheel column by means of the strapping means thereof so that the bag is brought to seal against the steering column. In case the air bag is released by accident gas and chemical substances are collected in the protection bag, whether the protection bag is mounted on the front side or the rear side of the protection apparatus, and said bag thereby eliminates, as far as possible, spreading of the chemical residuals from the accidentally released air bag in the car.

To provide further safety against occasional injuries in case the air bag is accidentally released the center plate, or the center plate facing the steering wheel, is formed with several small knives which cut open small leaks of the air bag if said bag is being released by accident. Said knives may be several triangular wings which are punched down and have their points facing the air bag.

BRIEF DESCRIPTION OF THE DRAWINGS

Further characteristics and advantages of the invention will be evident from the following detailed specification in which reference will be made to the accompanying drawings. In the drawings.

DETAILED DESCRIPTION OF THE PREFERRED EMBODIMENTS

Figure 1:
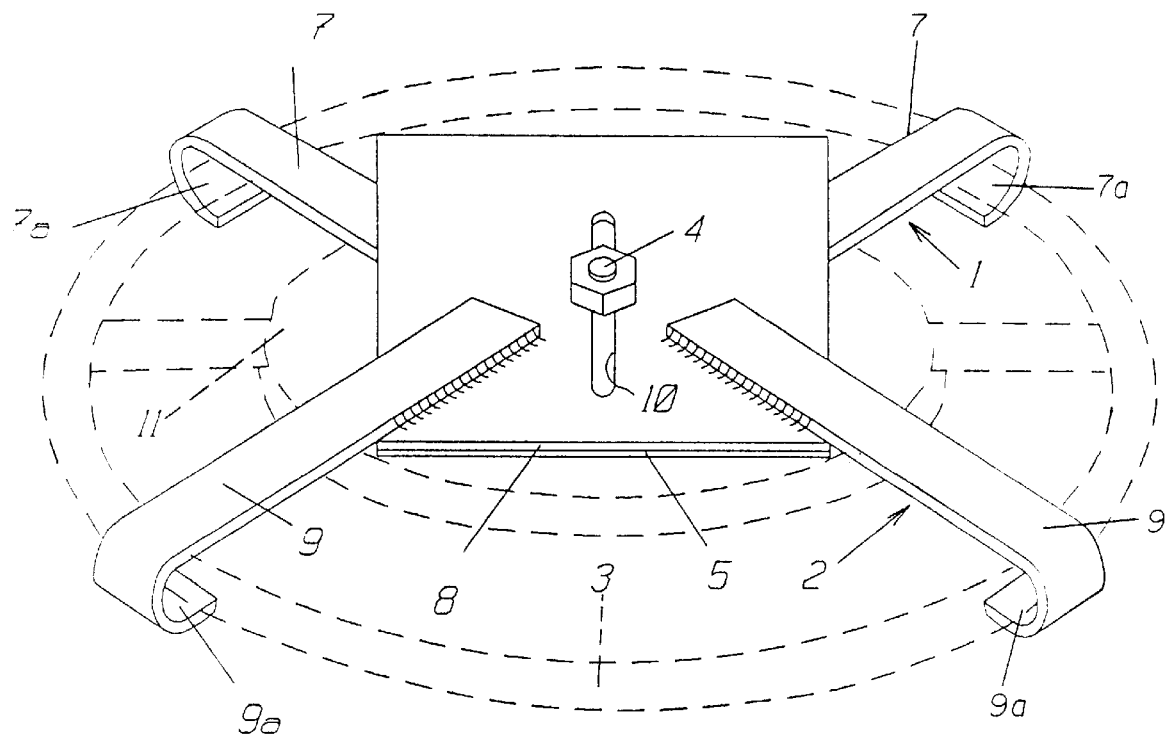
FIG. 1 shows, in a perspective view and seen from the front side of the steering wheel with said steering wheel only diagrammatically marked, a first embodiment of a protection apparatus according to the invention.

The air bag protection apparatus shown in the drawings comprises a center mounting means and at least three co-operating arms, the outer ends of which are bent to form hooks adapted to be connected to the steering wheel ring, and which arms are adjustable in relation to each other so that the entire protection apparatus can be locked to a steering wheel of a vehicle and can prevent an accidentally released air bag from becoming inflated.

Figure 2:
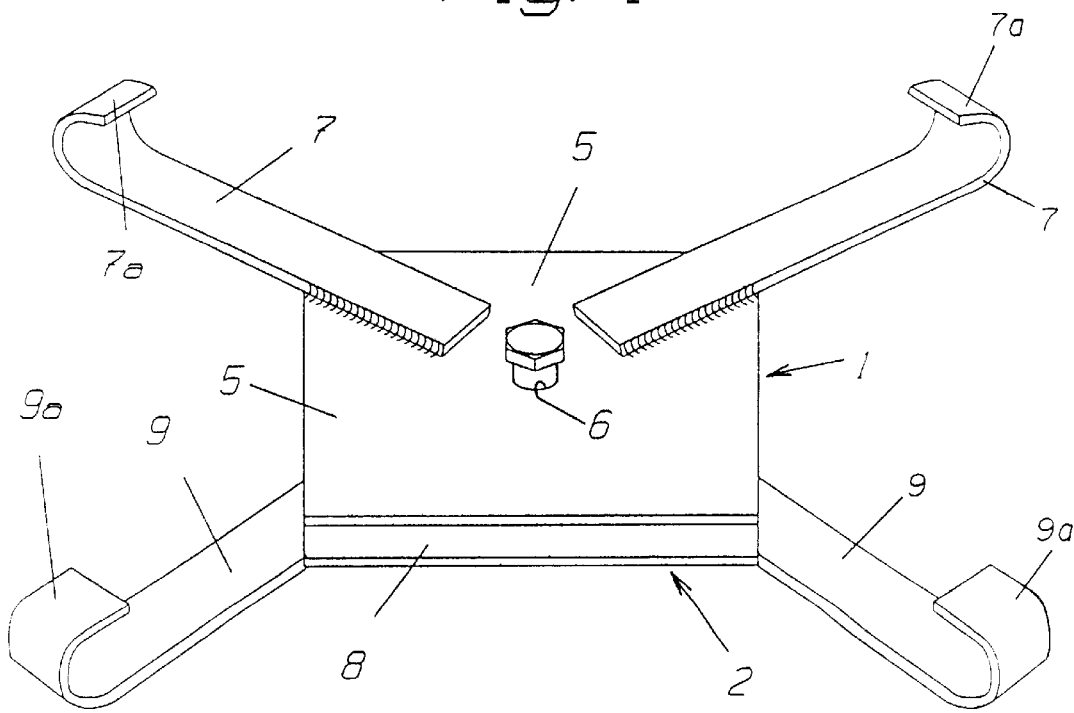
FIG. 2 is a bottom perspective view of the protection apparatus of FIG. 1.
Figure 3:
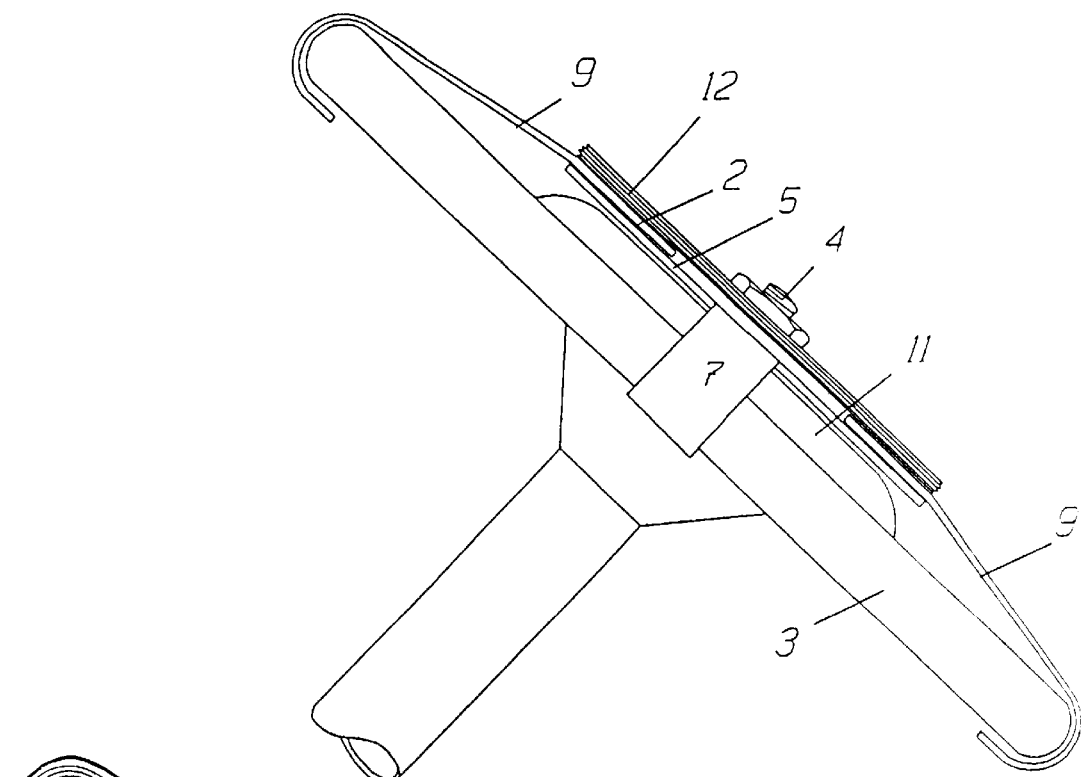
FIG. 3 is a side view of a steering wheel having a protection apparatus mounted thereon.

The embodiment shown in FIGS. 1 and 2 comprises two main parts, namely a lower part 1 and an upper part 2, which parts can be displaced in relation to each other and can be locked to each other and to the steering wheel 3 of a vehicle, for instance by means of a central lock bolt 4.

In the illustrated example the lower part 1 comprises a center plate 5 having a central bore 6 for the lock bolt 4 and two radially outwardly projecting arms 7 extending at 90° angle to each other and which can be welded to the bottom surface of the center plate 5 or can be secured thereto in any other way. The ends of the arms are bent over to form hooks 7a arranged to be able to clasp the ring of the steering wheel 3. The upper part 2 has substantially the same appearance as the lower part 1, and it also comprises a center plate 8 and two outwardly projecting arms 9 having bent over hooks 9a and extending at about a 90° angle to the arms 7 of the lower part 1. The arms 9 can be welded to the upper surface of the center plate 8. The center plate 8 is formed with an elongated slot 10 by means of which the lower part 1 can be displaced in relation to the upper part 2 and can thereafter be locked thereto.

It is possible to form the apparatus with only three arms, which are preferably distributed over a 120° angle, whereby either the lower part or the upper part is formed with only one arm.

Figure 4:
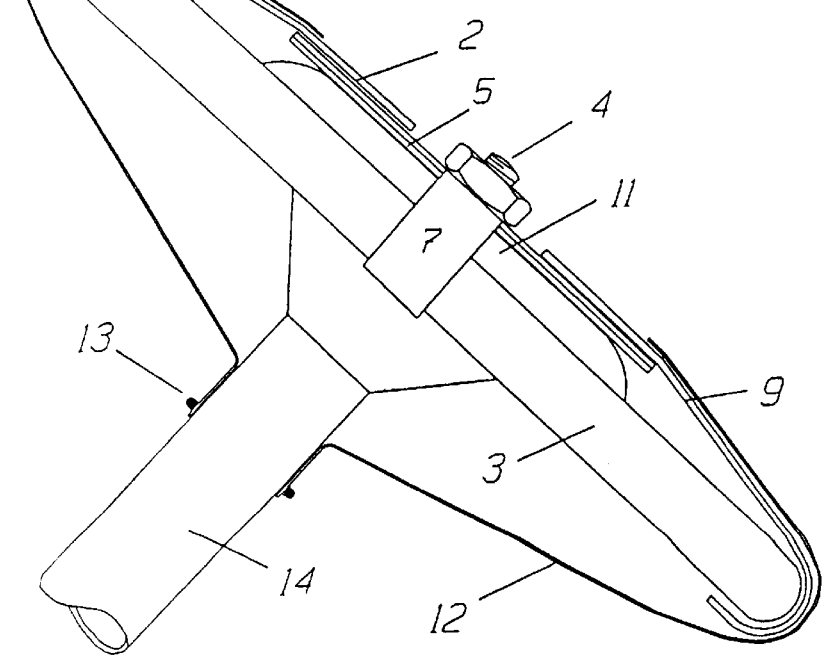
FIG. 4 correspondingly shows the protection apparatus with the protection bag thereof in its mounted state.

To prevent chemical residuals from blowing into the vehicle occupant compartment in case the air bag 11 mounted on the steering wheel 3 should happen to accidentally be released, referring to FIG. 4 the apparatus is formed with a protection bag 12 of a suitable material, such as polyamide fabric, the bottom of which is glued, riveted or otherwise secured to the upper surface of the upper part 2. The protection bag can be mounted in front of the protection apparatus, or on the rear side of the protection apparatus. In the latter case the opposite end of the protection bag is open and is wide enough that it can be pulled both over the upper part 2 and the lower part 1 and over the steering wheel 3 to which the air bag protection apparatus is mounted. The free end of the protection bag 12 is formed with a strapping means 13 by means of which the protection bag can be tightened and strapped round the steering wheel column 14.

In case the air bag 11 of the car should happen to be released unintentionally the center plate 5,8 and the arms 7,9 prevent the air bag from being inflated. The gases and the residuals formed during the releasing of the air bag are completely, or at least partly, collected by the protection bag 12.

Figure 5:
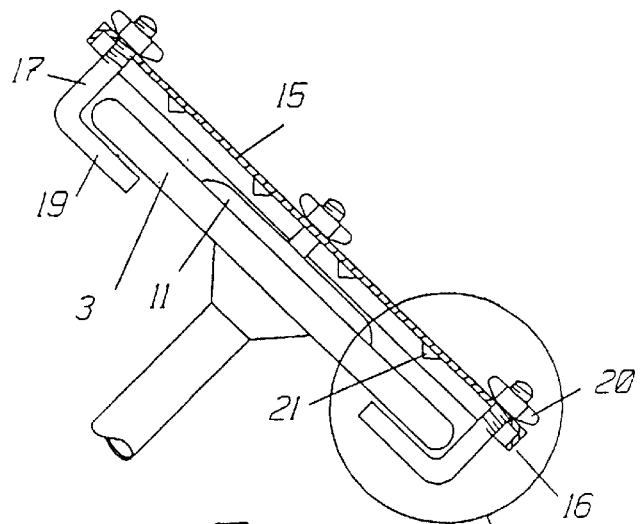
FIG. 5 is a side view of an alternative embodiment of a protection apparatus of the invention.
Figure 6:
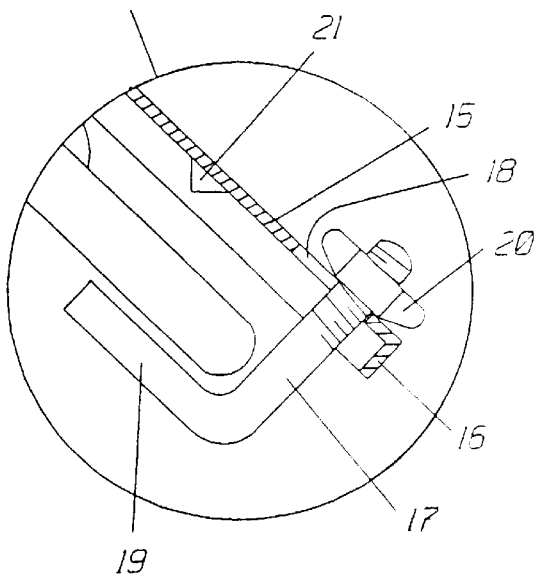
FIG. 6 shows, in double scale, the encircled detail of FIG. 5.
Figure 7:
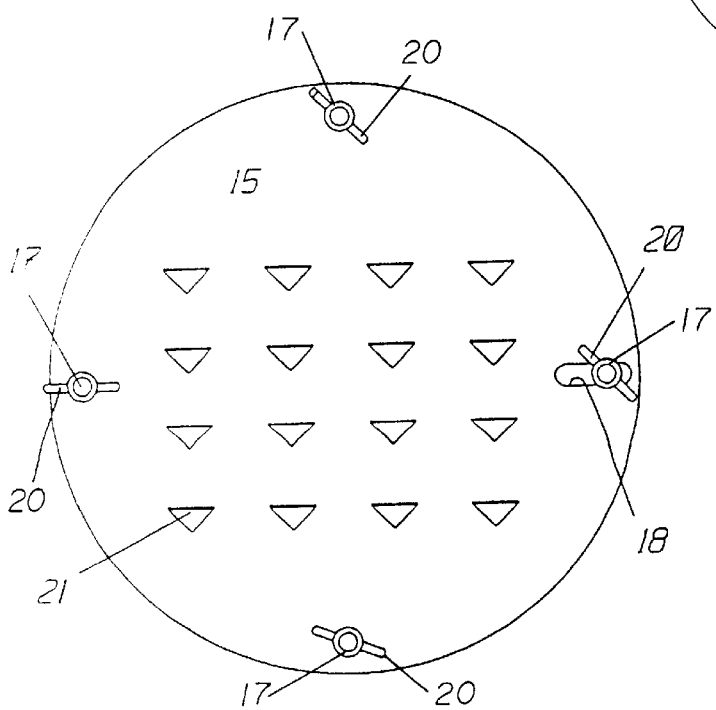
FIG. 7 shows the protection apparatus of FIG. 5 seen from above.

In FIGS. 5–7 there is shown an alternative embodiment of the protection apparatus, which is formed with one single center plate 15 having outer edges 16 which are bent towards the steering wheel and are intended to catch the air bag in case said air bag should be inflated. The bent edges can for instance have a length in the axial direction of 50 mm. The apparatus is formed with three or more angular locking arms 17 each of which extends through a bore or a slot 18 of the center plate 15 and which is threaded so that the lower angular part 19 thereof can be clamped to the bottom side of the steering wheel ring, for instance using wing nuts 20 on said threads. At the bottom surface of the center plate 15 there are several small knives 21, formed for instance as triangular knives which are punched inwards/downwards from the center plate 15 so as to form sharp points facing the steering wheel, which points prick holes in the air bag 11 in case said air bag should accidentally be inflated.

When the protection apparatus of FIGS. 5–7 is to be mounted the locking arms 17 are rotated so that the angular part 19 of each arm is placed under the steering wheel ring and the arms are tightened by means of the nuts 20. The apparatus can be adapted to steering wheels of different shapes, different diameters and different widths. Also this last mentioned embodiment is preferably formed with a protection bag which can be pulled over the steering wheel and can be strapped around the steering wheel column and which catches the gas and the chemical substances which are emitted if the air bag 11 should be released unintentionally.

Figure 8:
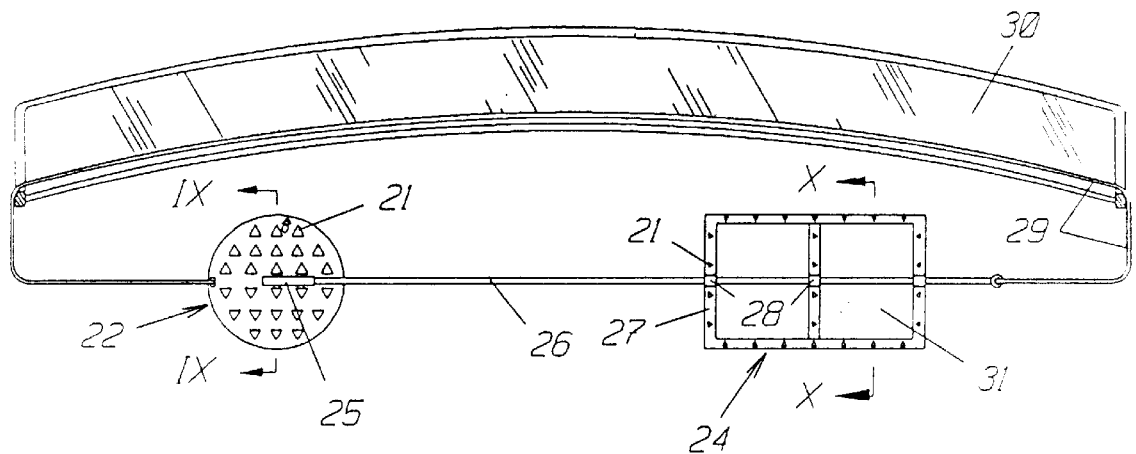
FIG. 8 is a top view of a further embodiment of the invention having a first protection apparatus mounted on the steering wheel and a second protection apparatus mounted in front of the passenger seat air bag.
Figure 9:
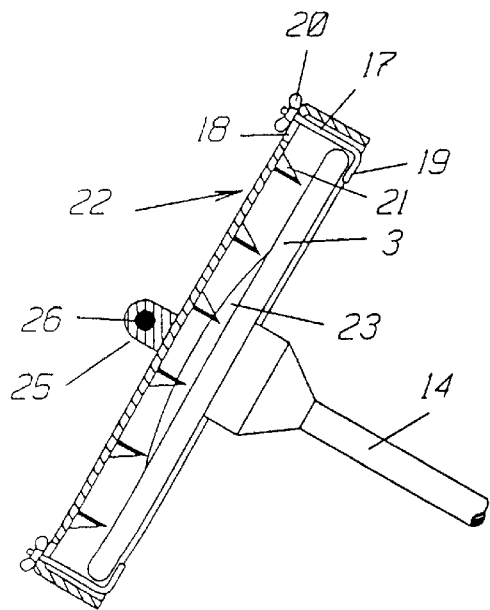
FIG. 9 is a cross section view along line IX—IX of FIG. 8.
Figure 10:
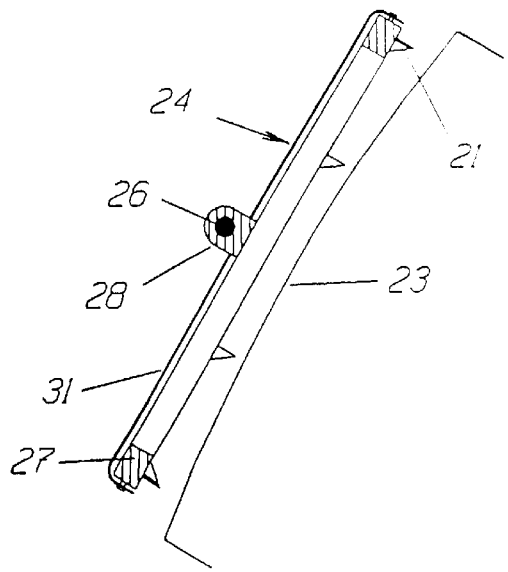
FIG. 10 is a cross sectional view along line X—X of FIG. 8.

The protection apparatus shown in FIG. 8 is useful for cars having an air bag 23 both for the driver and the front passenger. The protection apparatus 22 for the driver air bag 23 can be of the same type as shown in FIGS. 5–7 (except that it is shown only schematically without the connecting elements in FIG. 8). At a place on the front surface thereof the center plate 15 has a connection tube 25 for a connection bar 26, which is connected to the protection apparatus 24 for the passenger seat air bag. Said last mentioned protection apparatus 24 is formed as a frame 27 having on the front surface connection tubes 28 for connection bar 26 and having on the rear side punched out knives 21. The passenger seat protection apparatus 24 can be mounted by connecting the connection bar 26 to the right side window of the car, to a part of the ceiling or any other part of the car, or a wire 29 can be drawn from the passenger protection apparatus 24, through a side window of the car, over and across the windshield 30 of the car and can be connected to the driver protection apparatus 22 with the opposite end of said wire 29.

The framework 27 of the passenger protection apparatus leaves an open space inside the framework and said space is covered by a fabric acting as a protection bag 31 for collection of the gases and chemical residuals after the air bag has released.

I claim:

1. Air bag protection apparatus for eliminating accidents in case of unintentional inflating of an air bag mounted to a steering wheel of a vehicle and being inflated by a pyrotechnical charge following a strong deceleration, said apparatus comprising at least one center plate and means for mounting the center plate over a ring of the steering wheel of the vehicle in front of the air bag, said mounting means comprising at least three arms which can be adjusted and locked in relation to each other and can be locked against the steering wheel and which are formed with bent in hooks at ends thereof adapted to engage an outer periphery of said steering wheel ring, the apparatus also being formed with a protection bag mounted so that it can receive at least part of the gas which is issued by an air bag which is accidentally released, and which is wide enough to be able to be pulled rearward and downward over the mounting arms and the steering wheel.

2. Air bag protection apparatus according to claim 1, wherein the protection bag is formed of a polyamide fabric.

3. Air bag protection apparatus according to claim 1, wherein the protection bag, at a free end thereof, is formed with a strapping by means of which the protection bag can be strapped or clamped against a steering wheel column behind the mounting arms and the steering wheel.

4. Air bag protection apparatus according to claim 1, wherein the at least one center plate comprises a lower center plate and an upper center plate which is displaceable relative to the lower center plate, one of said center plates carrying one or two of said mounting arms and the other center plate carrying two of said mounting arms, which mounting arms are arranged at mutual angles of about 120° or 90°, and wherein one of the plates is formed with a central bore for a locking bolt and the other center plate is formed with a slot in which the locking bolt can be displaced to facilitate mounting of the protection apparatus on the steering wheel.

5. Air bag protection apparatus according to claim 1, wherein said mounting arms are three or more angular locking arms having threaded ends receiving nuts and extending through bores or slots in the center plate, and angular ends which are rotatable to a position beneath the steering wheel and which can be locked against the steering wheel by means of the nuts engaging the threaded ends of the locking arms.

6. Air bag protection apparatus according to claim 1, wherein a surface of the center plate facing the steering wheel is formed with several small knives adapted to prick or cut holes in the air bag in the event that the air bag is unintentionally inflated.

7. Air bag protection apparatus according to claim 6, wherein the knives of the center plate are formed as several triangular bodies punched downwards from the center plate and having their points facing the air bag.

8. Air bag protection apparatus according to claim 1 for a car having an air bag at both the driver side and the passenger side, wherein the protection apparatus includes a driver protection apparatus which has a connection tube for a bar extending in the transverse direction of the car, and wherein the bar carries a passenger protection apparatus in front of the passenger's air bag.

9. Air bag protection apparatus according to claim 8, wherein the connection bar for the two protection apparatus is secured at the passenger side of the car and wherein an outer end of the bar is connected to the driver's protection apparatus by a wire extending around a windshield of the car.

\* \* \* \* \*